United States Patent Office 2,700,765
Patented Feb. 1, 1955

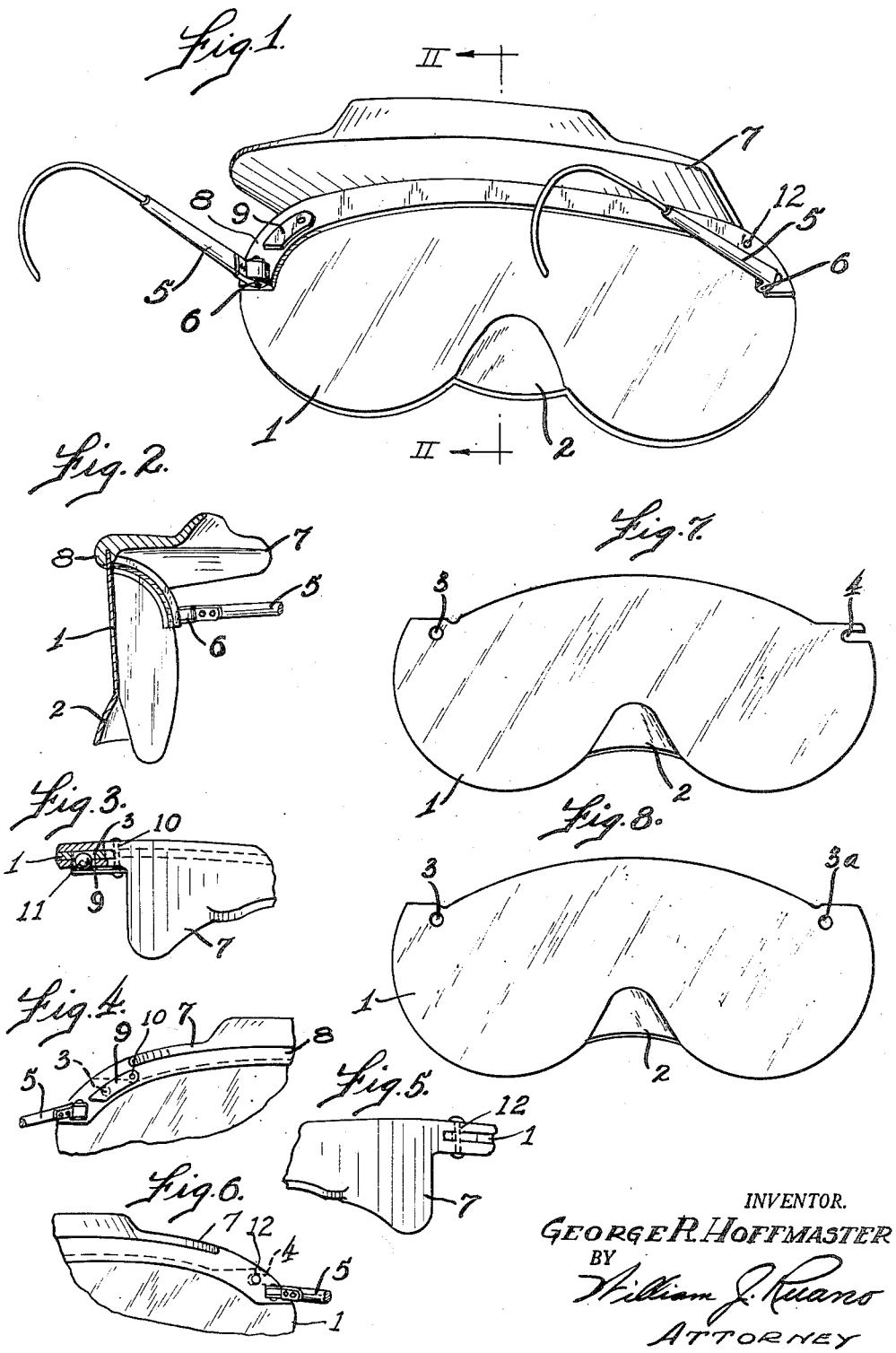

2,700,765

DETACHABLE LENS CONSTRUCTION FOR PROTECTIVE GLASSES

George R. Hoffmaster, Esterly, Pa., assignor to Willson Products, Inc., a corporation of Pennsylvania Application December 13, 1952, Serial No. 325,812

4 Claims. (Cl. 2—14)

This invention relates generally to ophthalmic mountings, and more particularly to goggles having an improved means for readily detachably connecting a lens to its frame to enable replacement of the lens when pitted or otherwise requiring replacement.

Goggles having plastic lenses have been used to protect the eyes of workmen, such as chippers, spot welders, chemical workers ind danger of splashing liquids and workers in a wide variety of other occupations involving eye hazards. An outstanding disadvantage of goggles of conventional construction is that the lens mounting means is either of permanent or of semi-permanent construction making lens replacement time consuming and difficult, or in the case of detachable fastening means of constructions generally used, such means include complicated parts which add considerably to the cost of manufacture.

An object of the present invention is to provide a novel pair of goggles devoid the above named disadvantages and for effectively protecting the eyes of a workman against the hazards of flying sparks or metal particles, chemical splashes etc.

Another object of the invention is to provide a pair of industrial goggles of simple construction and light in weight including a replaceable plastic lens in the form of a single sheet and having novel readily detachable fastening means whereby such lens may be easily and quickly attached or detached with respect to the frame.

A more specific object of the invention is to provide a simple inexpensive detachably fastening means for goggle lenses including a spring actuated ball adapted to fit into a hole near the edge of the lens to securely mount the lens on the frame and to permit easy detachment or attachment thereof when it is desired to replace the lens.

Other objects and advantages of the invention will become apparent from a study of the following specifications taken with the accompanying drawing wherein:

Figure 1 is a perspective view of an ophthalmic mounting embodying my invention and in the form of a pair of light weight industrial goggles.

Figure 2 is a cross-sectional view taken along line II—II of Figure 1.

Figure 3 is a fragmentary top view, shown partly in cross section of the spring actuated ball assembly for detachably fastening lens 1 shown in Figures 1 and 2.

Figure 4 is a fragmentary plan view of the lens supporting assembly shown in Figure 1 and showing the contour of the upper edge of lens in dotted outline.

Figure 5 is a fragmentary top view showing the right hand portion of the lens mounting illustrated in Figures 1 and 2.

Figure 6 is a plan view showing the right hand side of the lens mounting illustrated in Figure 5 and including the lens aperture arrangement shown in Figure 7.

Figure 7 is a plan view of a single lens sheet having a hole and slot for its mounting and;

Figure 8 is a plan view of a lens sheet having two holes for its detachable mounting.

Referring more particularly to Figure 1, numeral 1 denotes a one-piece lens sheet, which may be of glass or transparent plastic material, and which may include an outwardly projecting nose piece portion 2. At the sides of the lens sheet adjacent the top thereof there is provided, as shown more clearly in Figure 7, a hole 3 and a slot 4. An alternative design is that shown in Figure 8 wherein holes 3 and 3a are provided. The purpose of each of these holes is to provide a depression into which a spring actuated ball may be fitted to detachably but firmly hold the lens sheet on the frame, as will appear more clearly hereinafter.

A pair of temples 5 are pivotally connected at 6 to a plastic (or metal) frame member or brow-bar 8 adapted to surround the upper edge of the lens sheet 1. Integrally fastened to the brow-bar or frame member 8 at right angles is an eye shield 7 which may be of transparent or translucent plastic material of dark color, or in fact, may be of opaque material if so desired. Shield 7 has an upwardly extending and curved marginal edge adapted to fit the contour of the forehead and to act as a spacer to separate the lens sheet from the eyes of the wearer and to shield the eyes from flying particles emanating from the work.

Mounted on one side of frame 8 is a small leaf spring 9 which is fastened at one end to the frame member 8 by means of a rivet 10 or by other suitable fastening means.

As shown more clearly in Figure 3 the frame member 8 comprises two spaced elements having a slot therebetween into which may be projected the top edge portion of the lens sheet which contains hole 3 and slot 4. A hole is provided in one of the elements at the left side of frame member 8 into which is fitted a small ball 11 which is resiliently held in place by means of the leaf spring 9.

In operation, it will be apparent that in order to mount the lens sheet 1, the top edge thereof is slid into the slot between the elements of frame member 8 so that hole 3 comes into registry with the hole in which the ball 11 is seated and in so doing pushes ball 11 outwardly against the action of the spring until hole 3 comes into registry with the hole in the frame element as shown in Figure 3. In this position the ball becomes seated in hole 3 to securely hold the lens sheet in place. Similarly if the lens sheet is of the construction shown in Figure 8 another hole 3a is moved into registry with a spring actuated ball and a hole in the frame element located at the right hand side of the goggles (not shown) similar in construction to the assembly shown at the left of Figure 3.

If a lens sheet having apertures as shown in Figure 7 is used, the slot is first positioned about a rivet 12 such as shown in Figures 1, 5 and 6 and thereafter hole 3 is moved into registry with the spring actuated ball and the hole in the left portion of the frame member. Of course, to detach the lens sheet the left portion of the lens, as viewed in Figure 3, is first pulled away from the spring actuated ball fastening means and thereafter the right portion is moved away from the pin (or rivet) and slot connection 12—14.

Thus it will be seen that I have provided a novel and efficient construction for industrial goggles or protective ophthalmic mountings, including a protective top shield for comfortably supporting the goggles on the forehead and including detachable connection means for the lens comprising a spring actuated ball to provide easy and quickly operated fastening means whereby the lens sheet becomes readily detachable when it is desired to replace the lens sheet with another sheet; furthermore, I have provided a simple leaf spring actuated ball fastening means which is extremely simple and inexpensive in construction involving a minimum number of parts and having relatively long life.

While I have illustrated and described certain specific embodiments of my invention, it will be understood that these are by way of illustration only, and that various charges and modifications may be made within the contemplation of my invention and within the scope of the following claims.

I claim:

1. An ophthalmic mounting for protective lens, comprising a frame member having spaced portions with a slot therebetween, one of said portions including a hole, a small ball contained within said hole, a small leaf spring mounted on the outside of one of said portions to serve as a stop element and yieldably holding the ball in said hole, and a lens having an aperture adjacent an edge thereof which is adapted to come into registry with said ball and hole, and into which said ball is adapted to become seated under the action of said spring, thereby providing a readily attachable or detachable fastening means for mounting said lens on said frame member.

2. A pair of industrial goggles comprising a frame and a single lens sheet having apertures at the upper side edges thereof, said frame including a small leaf spring fastened on the outside of one end portion of the frame and overlying a hole therein, a ball and, said leaf spring supporting the ball in said hole and acting as a stop element therefor, said end portion of the frame including a slot into which the top edge portion of the lens sheet is adapted to be slid until the lens aperture comes into registry with said hole and ball, thereby providing a spring-actuated, readily detachable fastening means for securely holding one side of the lens sheet on said frame.

3. Industrial goggles comprising a frame including a brow-bar having a pair of temples pivotally mounted on the extremities thereof and including spaced elements, a lens sheet having an upper edge portion adapted to be sandwiched between said spaced elements, a rivet extending through the gap between said elements at one side of said frame, a ball and leaf spring assembly mounted on the other side of said frame, said leaf spring having one end rigidly secured to the outside of said frame so as to hold in a yielding manner the ball in a hole in one of said spaced elements, said lens sheet having a slot at the upper edge opposite said side having the hole, whereby after said slot is fitted against said rivet, the hole containing portion of the lens sheet may be slipped into said gap until the hole of the lens sheet comes into registry with said ball.

4. Industrial goggles including a slotted brow-bar having a pair of temples pivotally mounted on the extremities thereof, detachable fastening means for detachably fastening the upper edge portion of a lens sheet within the slot of said brow-bar, said detachable fastening means including a rivet fixed to one end of said brow-bar and extending through an aperture in said lens sheet, and at the other end, a hole in said brow-bar and a cut out portion in said lens sheet, a ball in said hole and seated in said cut out portion, a leaf spring having one end fixed to said brow-bar and the other end engaging and yieldably holding said ball in its seat, an eye shield integrally secured to the top of said brow-bar and projecting substantially at right angles thereof toward the forehead of the wearer, and having a forehead-engaging marginal edge portion shaped to fit the contour of the forehead of the wearer.

References Cited in the file of this patent

UNITED STATES PATENTS

| 2,169,075 | Shyer | Aug. 8, 1939 |
| 2,177,035 | Gatten | Oct. 24, 1939 |
| 2,529,110 | Splaine | Nov. 7, 1950 |

FOREIGN PATENTS

| 467,299 | Great Britain | June 15, 1937 |